United States Patent [19]

Fujishima

[11] 3,881,752
[45] May 6, 1975

[54] FLANGE

[76] Inventor: George S. Fujishima, 1713 Kaumulii St., Honolulu, Hawaii

[22] Filed: Sept. 24, 1973

[21] Appl. No.: 399,684

[52] U.S. Cl. .............................................. 285/46
[51] Int. Cl. ............................................ E04b 5/48
[58] Field of Search ............ 285/192, 46, 43, 42, 44

[56] References Cited
UNITED STATES PATENTS

| | | | |
|---|---|---|---|
| 2,244,939 | 6/1941 | Carlson | 285/46 X |
| 2,985,465 | 5/1961 | Church | 285/42 |
| 3,278,201 | 10/1966 | Noland | 285/46 |
| 3,615,108 | 10/1971 | Toth | 285/46 |
| R26,026 | 5/1966 | Dibley | 285/43 |

Primary Examiner—Alfred R. Guest
Attorney, Agent, or Firm—James C. Wray

[57] ABSTRACT

A plumber's flange is constructed from a thin flexible and resilient plastic sheet material. An upstanding bead around the circumferential edge and an upstanding bead around the central opening promote rigidity and strength and form stability of the flange in use. The central opening is stretched around a pipe and tightly engages the pipe in a gas and water tight seal. The outer circumferential edge is pressed tightly against the wall. Stresses within the flange press the central opening against the pipe and press the outer circumferential edge tightly against a wall in sealing relationship.

7 Claims, 3 Drawing Figures

FLANGE

BACKGROUND OF THE INVENTION

A need exists for a tight sealing flange for pipes and conduits passing through wall openings which will withstand long use at varied temperatures and which will continuously press tightly against a pipe and wall to prevent egress of odors and fluids from the wall and to prevent ingress and egress of insects and to prevent collection of dirt and filth.

In every building pipes are passed through walls. Holes are made in the walls which are substantially larger than the pipes, and the pipes are placed through the holes. The area between a pipe and a wall is usually sealed by placing a flange on the pipe and passing the flange along the pipe until it comes to rest against the wall.

Several types of flanges are known. Among common flanges are hinged flanges which surround a pipe near a wall. Other more recent flanges have inserts which attempt to tightly seal the pipe or to tightly hold the pipe while the flange is turned, in the interest of compensating for misalignments of pipe and wall surface and in the interest of holding the flange tightly on the pipe.

Still other known flanges have segmental projections for engaging pipes and tightly holding the pipes while outer edges are pressed against walls.

Under most conditions the flanges exactly fit the pipes on which they are placed. Care is taken to keep the flanges rigid by designing them in such manners that their main bodies do not flex. Usually there are small gaps between the pipes and flanges or between the flanges and walls.

SUMMARY OF THE INVENTION

The present invention comprises a flat, circular, thin, resilient plastic flange having an upset bead on one face around a circumferential edge and having an upset bead on the same face around the central opening in a preferred embodiment.

Preferably, the flange is made of a flexible, but resilient plastic, such as used in the well known non-transparent plastic covers for containers of various products in all sizes. Non-transparent polypropylene or polyethylene in assorted colors may be employed.

In a preferred construction, the flanges are cut from sheets of material with heated annular dies which pass through the material upon flowing the plastic. The particular method of forming the flanges at the same time produces the beads on the flanges.

Flanges may be employed without the circumferential bead or without the central opening bead, but the experience indicates strength and sealing is accomplished by using beaded flanges.

The flange seals a wall opening around a traversing pipe against free transmission of odors, dirt, dust and insects.

The preferred flange of the present invention has a central opening which is slightly smaller than the outside diameter of the pipe which is passed through the flange. The outer diameter of the flange should be greater than the outer maximum dimension of wall opening which the flange seals.

In the usual prior art applications, one size flange fits only one size pipe. Consequently it is necessary to store and carry many sizes of flanges when working on a job. Often, a plumber runs out of a particular size flange while many other flanges are still available in his gear. A great deal of time and expense is wasted in obtaining the proper fitting flanges.

In flanges of the prior art having rigid construction, the internal diameter of the flange is sometimes destroyed by misaligned pipes or by misaligning the flange with the pipe while pressing the flange into position. In that event, the flange is destroyed and is not effective in sealing a pipe and wall intersection.

A collection of examples of prior art flange disclosures are found in the United States Patent Office official classifications of inventions at Class 138, subclass 89, Class 16, subclass 2, and Class 4, subclasses 191 and 192.

U.S. Pat. No. 3,615,108 describes a preformed plastic flange having slightly expandable segmental inner lips, which grip the outer wall of a pipe but which do not tightly seal the pipe against the passage of dirt and insects. The flange does not deform in use to promote tight sealing of the flange against the wall.

The flange in U.S. Pat. No. 3,278,201 has a rigid outer piece and a flexibly joined inner piece to permit wall and pipe slight misalignment. That flange has none of the novel features and aspects of the present invention.

None of these flanges has the unique construction of the present flange. No flange of the prior art has a gripping, deforming and sealing characteristic.

The flange may be constructed of poly olefins, such as polyethylene or polypropylene or of polyvinyl chloride or polystyrene. Any thickness of material which has the properties of flexibility and resilience is useful.

In the preferred embodiment of the invention, the flange is constructed of plastic material having a thickness of about 60 mils. Material of about 10 to 120 mils is useful. Further useful material may exceed those limits.

When the material is formed as a flange, and when the flange is inserted on a pipe and is pushed against the wall, with the pipe opening of the flange spaced slightly from the wall, the flange forms a smooth curve, with the outer circumferential edge pressed tightly against the wall.

When the flange is first fitted on a pipe, the flange wrinkles and deforms. However, it has been found this deformation is caused by the same stressing of the flange which creates the wall sealing force and which produces the smooth curve over the normally flat surface of the flange, when the flange is supported against a wall.

In using the flange of the present invention, a plumber need have fewer flanges in his supplies. One flange fits several sizes of pipes.

While the beads are not necessary, they add strength to the flange. Several thicknesses of flanges and beads may be employed. As an example, in a preferred embodiment, the flange is about 0.038 inches thick, and the thickness of the flange and bead combined is approximately 0.060 inches. In another form the flange is approximately 1/16 inch thick and the combined thickness of flange and bead is approximately 3/32 inch.

The table is cited by way of example. Larger and smaller pipes or rods require larger or smaller flanges and openings. Outer diameters of the flanges may be varied or openings may be varied to suit applications. The flange thickness is given for an example. Thicker or thinner flanges may be employed. Flanges may taper uniformly or curvilineraly in cross section. Flanges may be flat and unbeaded. However, it has been found that beads increase strength of the flange.

TABLE

| FLANGE SIZE | | PIPE SIZE |
|---|---|---|
| Inner Diameter ID | Outer Diameter OD | OD |
| 7/16" | 2 7/16" | 1/2" to 5/8" |
| 11/16" | 2 7/16" | 3/4" to 1" |
| 15/16" | 3" | 1" to 1 1/4" |
| 1 3/8" | 3" | 1 1/4" to 1 15/16" |
| 2 1/16" | 4" | 2 1/8" to 2 5/16" |

An object of the invention is the provision of a tight sealing flange which seals both a pipe and a wall opening against ingress and egress of odors, dirt and insects.

Another object of the invention is the provision of the flange from a flat plastic flexible and resilient disc.

A further object of the invention is the provision of a flat flexible and resilient plastic flange having a central opening with a surrounding bead and having a circumferential bead on one face of the flange.

Another object of the invention is the provision of a flange having beads around a circumferential edge and around an inner opening edge for sealing or forming a smooth contour between an elongated round object and a surface.

The invention provides a flat flexible flange used in sealing any joint between a round object and a substantially flat object.

These and other objects and features of the invention are apparant in the disclosure which includes the specification with the foregoing and ongoing description and the claims and which includes the drawings.

DETAILED DESCRIPTION OF THE DRAWINGS

Figure 1:
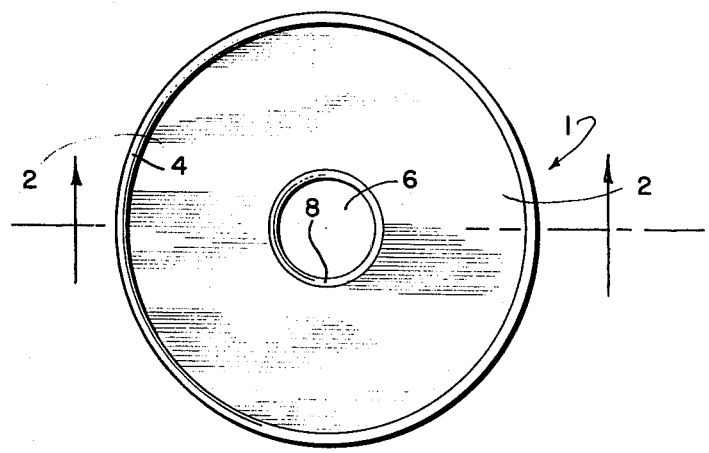
FIG. 1 is a plan view of the flange of the invention.
Figure 2:
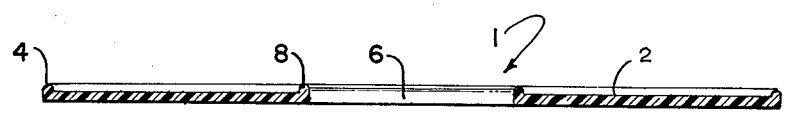
FIG. 2 is a cross sectional elevation of the flange.

In the drawing, the numeral 1 generally indicates a flange of the present invention. The flange has a flat, flexible resilient plastic body 2 approximately 1/16 inch thick. A bead 4 is integrally formed around a circumferential edge.

A central opening 6 is formed in the disc for receiving a pipe or other round object. A second, inner bead 8 surrounds opening 6. The beads extend approximately one thirty-secondth of an inch beyond the front face of the flange.

At rest the flange 1 is flat. When the flange is in use, stretching the central opening 6 about a pipe stresses the flange and causes it to warp. When the stressed flange is pressed against a surface, the stresses are focused, and the outer circumference of the flange is pressed tightly and uniformly against the surface. A smooth curved flange results. The flange continues to press against the surface throughout the life of the interconnection.

Varied sizes of pipes, dowels and round objects may be used with one size of flanges. The flanges may be used against any suitable surface. A flat or spheroid surface is preferred.

While the flange may be constructed out of any suitable materials, high density polyolefins have proved effective in possessing the necessary qualities of stiffness, stress flow and temperature variation withstanding over long periods of time.

Figure 3:
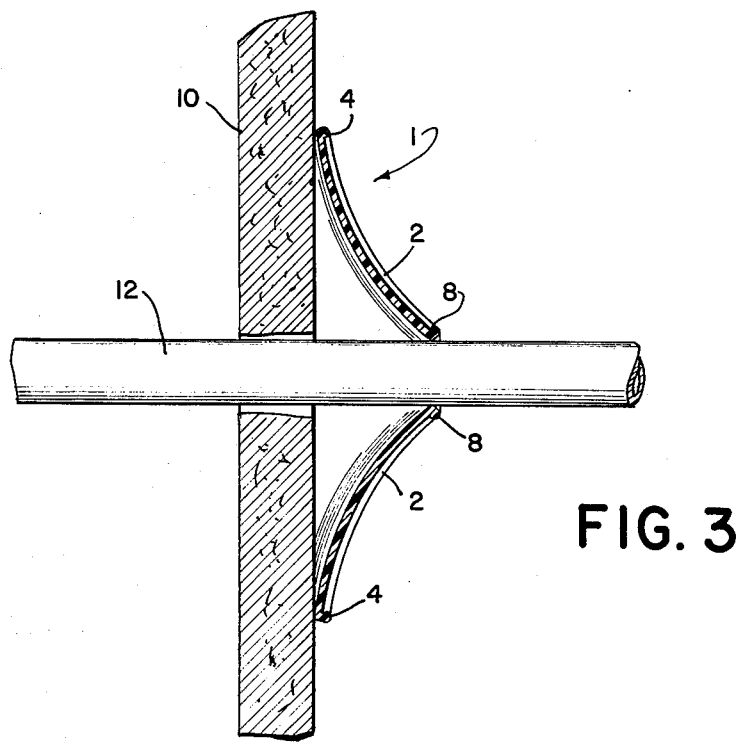
FIG. 3 is a schematic representation of the flange in a sealing relationship between a pipe and a wall.

In FIG. 3 wall 10 has a rough hole, through which pipe 12 passes in a convention plumbing installation. To cover the unsightly rough aperture in wall 10 and to seal the wall-pipe traverse, a flange 1 is employed.

The flange has been pushed on the pipe, slightly stretching its central opening and distorting the flange. The outer edge of the flange has been pressed against the wall as the flange has been moved toward the wall. Consequently, the flange has assumed a smooth curve over its body 2, which further pushes the edge against the wall. Bead 4 assists in the seal by helping to keep the edge flat against the wall. Bead 8 keeps the central opening in tight sealing relationship on the pipe. The result is the intersection between pipe and wall is tightly sealed against odors, dirt and insects. The seal is attractive, and it remains in operation for an extended time.

While the invention has been described with reference to a specific embodiment, it will be obvious to those skilled in the art that modifications and variations may be constructed without departing from the spirit and scope of the invention. The scope of the invention is defined in the following claims.

I claim:

1. A wall hole and pipe sealing flange comprising a relatively thin flexible laterally resilient plastic body having a generally round circumferential edge and having a central generally round opening for receiving and tightly gripping a pipe whereby when the central opening is placed over a pipe and slid toward a wall slightly spaced from a wall, only the outer circumferential edge portion automatically presses tightly against the wall, and the body portion between the outer circumferential edge and the central opening assumes a uniform smooth curve.

2. The flange apparatus of claim 1 wherein a bead is integrally formed around the circumferential edge.

3. The flange apparatus of claim 2 wherein the bead is formed on a first face of the flange body along the circumferential edge.

4. The apparatus of claim 1 further comprising a bead integrally formed around the central opening.

5. The flange apparatus of claim 4 wherein the bead extends outward perpendicularly from a first face of the flange.

6. The flange apparatus of claim 1 having first and second opposite side faces and further comprising a first circumferential bead formed along the circumferential edge and extending perpendicularly outward from the first face, and a second bead extending perpendicularly outward from the first face around the central opening.

7. The apparatus of claim 1 further comprising in combination with the flange a pipe tightly fitting within the central opening and a wall having an aperture through which the pipe flange projects, the circumferential edge of the flange being pressed tightly on one surface of the wall on a circular area of the wall spaced around the aperture in a sealing relationship.

* * * * *